United States Patent
Ikeo et al.

(10) Patent No.: US 6,722,785 B1
(45) Date of Patent: Apr. 20, 2004

(54) FLUID DYNAMIC BEARING

(75) Inventors: Izumi Ikeo, Tokyo (JP); Masatoshi Nakayama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/599,858

(22) Filed: Jun. 23, 2000

(30) Foreign Application Priority Data

Jun. 25, 1999 (JP) .......................................... 11-179346

(51) Int. Cl.$^7$ .......................... F16C 33/12; G11B 17/02
(52) U.S. Cl. ........................ 384/112; 384/100; 384/111; 384/118; 384/123
(58) Field of Search ................................ 384/102, 105, 384/107, 111, 112, 113, 114, 115, 118, 120, 121, 123, DIG. 907.1, 100; 360/107; 427/576

(56) References Cited

U.S. PATENT DOCUMENTS

| | | | |
|---|---|---|---|
| 3,535,169 A | | 10/1970 | Caubet et al. |
| 5,734,530 A | * | 3/1998 | Kim .......................... 360/107 |
| 6,157,515 A | * | 12/2000 | Boutaghou .............. 384/100 X |
| 6,331,332 B1 | * | 12/2001 | Wang ......................... 427/576 |

FOREIGN PATENT DOCUMENTS

| | | |
|---|---|---|
| DE | 299 125 | 3/1921 |
| DE | 339 649 | 7/1921 |
| DE | 636 486 | 10/1936 |
| DE | 18 58 666 | 9/1962 |
| DE | 2 020 099 | 12/1971 |
| DE | 1 758 550 | 3/1972 |
| JP | 58-174507 | 10/1983 |
| JP | 59-174507 | 10/1984 |
| JP | 59-174508 | 10/1984 |
| JP | 62-145646 | 6/1987 |
| JP | 62-145647 | 6/1987 |
| JP | 6-241232 | 8/1994 |
| JP | 7-37233 | 2/1995 |
| JP | 10-103414 | 4/1998 |
| JP | 10-326406 | * 12/1998 |
| JP | 11-62947 | 3/1999 |

OTHER PUBLICATIONS

E. Meyer–Raessler, et al., VDI–Zeitschrift, vol. 86, No. 15/16, pps. 245–247, "Neuartige Laufflaechen–Schutzverfahren Fuer Kolben Von Verbrennungsmotoren," Apr. 18, 1942 (with English Translation).

V.M Sorokin, Soviet Engineering Research, vol. 2, No. 11, pps. 26–28, "Investigating the Adhesion Strength and Durability of Anti–Friction Coatings After Strengthening by PSD," 1982.

E. Meyer–Raessler, et al., VDI–Zeitschrift, vol. 86, No. 15/16, pps. 245 and 247, "Neuartige Laufflaechen–Schutzverfahren Fuer Kolben Von Verbrennungsmotoren," Apr. 18, 1942.

V.M Sorokin, Soviet Engineering Research, vol. 2, No. 11, pps. 26 and 28, "Investigating the Adhesion Strength and Durability of Anti–Friction Coatings After Strengthening by PSD," 1982.

H. Kurokawa, et al., New Diamond Forum, vol. 4, No. 4, pp. 14–17, "Use of Diamond Thin Film for the Protective Layer in the Deposited Film", Oct. 25, 1988.

\* cited by examiner

*Primary Examiner*—David A. Bucci
*Assistant Examiner*—Colby Hansen
(74) *Attorney, Agent, or Firm*—Oblon, Spivak, McClelland, Maier & Neustadt, PC

(57) ABSTRACT

A fluid dynamic bearing has a shaft (11) fitted in a sleeve (12) for rotation, with a fluid filled therebetween. The shaft (11) and/or sleeve (12) is formed with a pattern consisting of grooves (111g) and lands for generating a pressure distribution in the fluid and then covered with a diamond-like carbon film (11c) over the surface of the grooves and the surface of the lands.

5 Claims, 2 Drawing Sheets

FLUID DYNAMIC BEARING

This invention relates to a fluid dynamic bearing for use in polygonal motors and other rotational drives in hard disk drive units.

BACKGROUND OF THE INVENTION

Fluid dynamic bearings for use in drives of high speed rotation as typified by hard disk drive units are generally constructed by fitting a shaft in a concentric sleeve for rotation and filling the gap therebetween with oil. The sleeve or shaft is provided with a radial pattern of herringbone channels, for example. Upon high-speed rotation of the shaft, a pressure distribution is created in the oil between the sleeve and the shaft whereby the shaft is kept afloat.

To prevent run-out, the shaft requires roundness, which requirement becomes important for high-speed rotation.

In the fluid dynamic bearing, no contact occurs in the steady state. During unstable low-speed rotation upon start-up and shutdown, however, contact can occur between the sleeve and the shaft, which are abraded. Then metal chips formed by abrasion and debris are admixed into the oil to change the viscosity thereof, resulting in a loss of performance or a reduced lifetime.

To overcome such problems, JP-A 7-37233 discloses a rotating drum supported by a fluid dynamic bearing in which grooves for generating a pressure are formed by a hard protective film, preferably a diamond-like thin film. Also JP-A 11-62947 discloses a fluid dynamic bearing comprising a shaft and a rotating sleeve which are provided on the surface with a carbon protective film, preferably of amorphous carbon or diamond-like carbon. In the preferred embodiment, the shaft is provided with grooves for generating a dynamic pressure, only the surface of the grooves is not covered with the carbon protective film, and the remaining surface of the shaft and the surface of the rotating sleeve are covered with the carbon protective film. Further, JP-A 6-241232 discloses a fluid dynamic bearing comprising a first bearing member formed to a cylindrical shape, a second bearing member through which the first bearing member is inserted and which has an inner surface opposed to the outer surface of the first bearing member at a predetermined spacing, and means disposed on the outer surface of the first bearing member or the inner surface of the second bearing member for generating a dynamic pressure. The dynamic pressure generating means generates a dynamic pressure between the outer and inner surfaces of the first and second bearing members for providing radial support. At least one of the outer surface of the first bearing member and the inner surface of the second bearing member is provided with a diamond grit cluster thin film.

Although the above-referred JP-A 7-37233 does not describe the detail about the formation of the pressure generating pattern by the hard protective film, two separate steps are necessary for forming the hard protective film and for forming the pattern. It is regarded appropriate to effect the patterning step by (a) photoresist technique or (b) laser etching. The photoresist technique (a) generally involves a series of steps of resist coating→drying→exposure→development →etching→resist removal. One typical laser etching technique (b) is by scribing with a laser beam a portion of a hard protective film to be patterned and removing that portion (see Japanese Patent Application No. 10-103414).

A substantial cost is needed when a hard protective film is formed and patterned by either of the above techniques. Additionally, since only the pressure-generating pattern is formed by the hard protective film, abrasion can occur on the bare portions of the members where no hard protective film is formed. Further, if the dynamic pressure-generating grooves are as deep as several microns to several tens of microns, a film having a corresponding thickness (of several microns to several tens of microns) must be coated, which is cumbersome. The coated film tends to peel off because of internal stresses.

With respect to JP-A 11-62947, in order that the dynamic pressure-generating groove portion be not covered with the carbon protective film, the dynamic pressure-generating groove portion is masked with a photoresist so that no amorphous carbon may deposit on that portion, and the photoresist is later removed with acetone. When the carbon protective film is formed and patterned by this process, the number of steps is increased as well as the cost. Abrasion can occur on those portions where the carbon protective film of amorphous carbon is not formed.

The method of JP-A 6-241232 is to form a uniform diamond grit cluster thin film on a bearing member by uniformly dispersing diamond cluster grits of about 10 nm (100 Å) in a plating solution, and codepositing the grits along with the plating material on a surface of the bearing member to be covered. The diamond grit cluster thin film formed by this method includes portions of diamond cluster grits and portions consisting solely of the plating material, of which the plating material portions can react with the metal of the associated member in contact therewith, causing corrosion and abrasion. As the plating is gradually worn away, the released chips are admixed into the oil along with diamond cluster grits whereby the oil is contaminated, leading to a shorter lifetime.

SUMMARY OF THE INVENTION

An object of the invention is to provide a fluid dynamic bearing comprising a shaft and a sleeve which has improved wear resistance and durability, maintains the roundness of the shaft unchanged over a long term of operation, experiences no loss of rotational precision by repeated operation, and is easy to manufacture.

According to the invention, there is provided a fluid dynamic bearing comprising a pair of members engaged for rotation with a fluid filled therebetween, the members bearing a concave and/or convex pattern consisting of grooves or protrusions and lands for generating a pressure distribution in the fluid, at least one of the pattern-bearing members being covered with a diamond-like carbon film. The at least one member is first formed with the pattern and then covered with the diamond-like carbon film over both the surface of the grooves or protrusions and the surface of the lands.

Preferably the diamond-like carbon film has a basic composition represented by $CH_xSi_yO_zN_vF_w$ wherein x, y, z, v and w representative of molar ratios of the associated elements are in the range: $0.05 \leq x \leq 0.7$, $0 \leq y \leq 3.0$, $0 \leq z \leq 1.0$, $0 \leq v \leq 1.0$, and $0 \leq w \leq 0.2$.

In one preferred embodiment, the fluid dynamic bearing has a shaft fitted in a sleeve for rotation with a fluid filled therebetween so that when the shaft rotates within the sleeve, a pressure distribution is generated in the fluid between the shaft and the sleeve for keeping the shaft afloat, the pattern-bearing member covered with a diamond-like carbon film is the shaft or the sleeve, which is first formed with the pattern and then covered with the diamond-like carbon film over the entire pattern-bearing region. Preferably the shaft has a collar opposed to one end portion of the sleeve and a shank fitted in the sleeve and having a surface in contact with the fluid, the collar has a thrust surface opposed to one end portion of the sleeve and provided with the pattern, and the thrust surface of the collar and the surface of the shank in contact with the fluid are covered with the diamond-like carbon film. Further preferably, the sleeve has a cylindrical inner wall surface in contact with the fluid, which is provided with the pattern, and the one end portion of the sleeve opposed to the collar of the shaft and the inner wall surface of the sleeve are covered with the diamond-like carbon film.

Typically the fluid is an oil or air or gas.

BRIEF DESCRIPTION OF THE DRAWINGS

The above and other objects, features and advantages of the invention will be better understood by reading the following description taken in conjunction with the accompanying drawings.

DESCRIPTION OF THE PREFERRED EMBODIMENT

Figure 1:
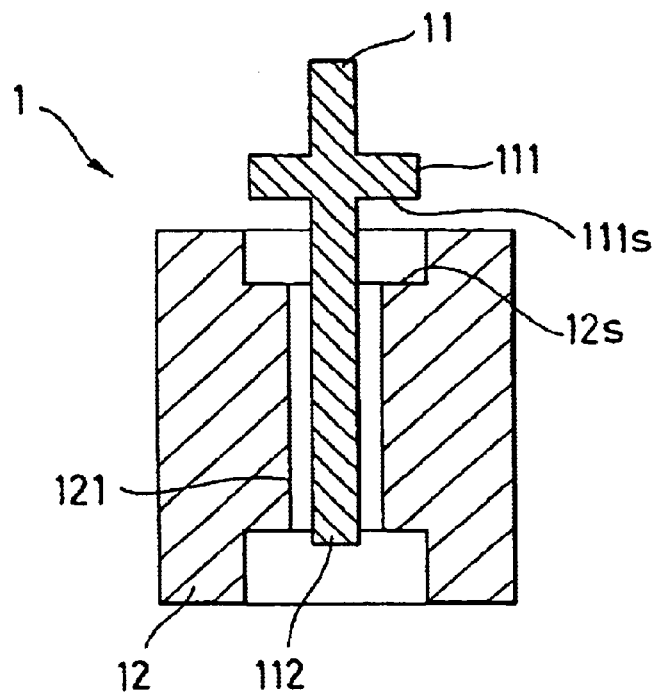
FIG. 1 is a schematic cross-sectional view of one exemplary fluid dynamic bearing including a shaft and a sleeve according to the invention.

The fluid dynamic bearing of the invention includes a pair of members engaged for rotation with a fluid filled therebetween. Each member bears a concave and/or convex pattern consisting of grooves or protrusions and lands for generating a pressure distribution in the fluid. This pattern is also known as a pressure generating pattern. The "lands" used herein are areas surrounding the grooves or protrusions and correspond to the original surface of the member. At least one of the members is covered with a diamond-like carbon (DLC) film. The one member is first formed with the pattern and then covered with the DLC film over both the surface of the grooves or protrusions and the surface of the lands. Preferably the DLC film covers the surface of grooves or protrusions along the profile thereof at a uniform thickness. On the lands, the DLC film preferably covers the entire surface of lands and also preferably covers at least adjacent portions surrounding the grooves or protrusions. The pattern-bearing member covered with the DLC film is specifically a shaft and/or a sleeve for receiving the shaft. After the member is formed with the necessary pressure-generating pattern, typically herringbone grooves, more specifically, after a shaft and/or sleeve substrate is formed with the pressure-generating pattern, the member (or substrate) is covered with the DLC film. Further preferably, the DLC film is applied to the thrust surface of the collar of the shaft opposed to one end portion of the sleeve, which can come in contact with the opposed portion upon start-up or shutdown, as well as the surface of the shank of the shaft in contact with the fluid between the shaft and the sleeve. Also preferably, the DLC film is applied to the surface of the one end portion of the sleeve opposed to the shaft collar and the surface of the cylindrical inner wall of the sleeve in contact with the fluid. Any one of these surfaces is previously formed with the pressure-generating pattern, and often, the thrust surface of the shaft collar and the surface of the cylindrical inner wall of the sleeve are previously formed with the pressure-generating pattern. The pressure-generating pattern is preferably formed by etching or plastic working.

Since the DLC film is a smooth uniform thin film, the shaft does not change its roundness after coverage with the DLC film. The DLC film prevents the shaft from being worn by the contact between the shaft and the sleeve upon start-up or shutdown. Then the shaft does not experience a drop of its roundness during repetitive operation, which prevents run-out. Where oil is used as the fluid, the oil is not contaminated with abraded debris or altered in viscosity and other properties, which precludes any loss of rotation precision. Since the formation of the pressure-generating pattern precedes the coverage with the DLC film, even a complex pattern can be formed and the manufacture is relatively easy. By contrast, when the pressure-generating pattern is formed by the DLC film as in JP-A 7-37233, one ordinary process involves depositing a DLC film and etching the film to form a pattern. This process requires complicated steps and is expensive. Wear may occur where the DLC film is absent. Further, if dynamic pressure-generating grooves are as deep as several microns to several tens of microns, a film having a corresponding thickness (of several microns to several tens of microns) must be coated, which is cumbersome. The thick film tends to peel off because of internal stresses. In JP-A 11-62947, the dynamic pressure-generating grooves are not covered with the carbon protective film. The process requires more steps and more expense. Wear may occur where the carbon protective film is absent. In the case of the plated diamond grit cluster thin film in JP-A 6-241232, the plating material portions of the film is liable to corrosion and abrasion. The oil used as the fluid is contaminated with abraded debris.

Figure 2A:
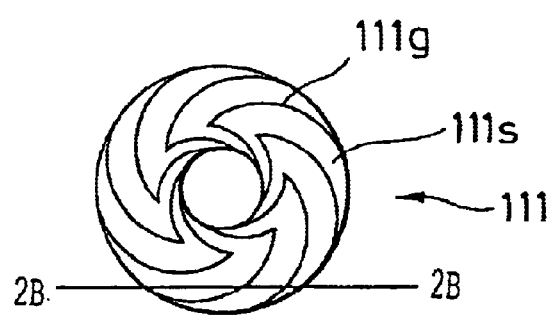
FIG. 2A is a plan view of a pressure generating pattern formed on the thrust surface of the shaft.
Figure 2B:
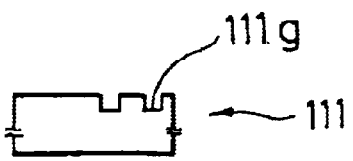
FIG. 2B is a cross-sectional view taken along lines A–A' in FIG. 2A.
Figure 3:
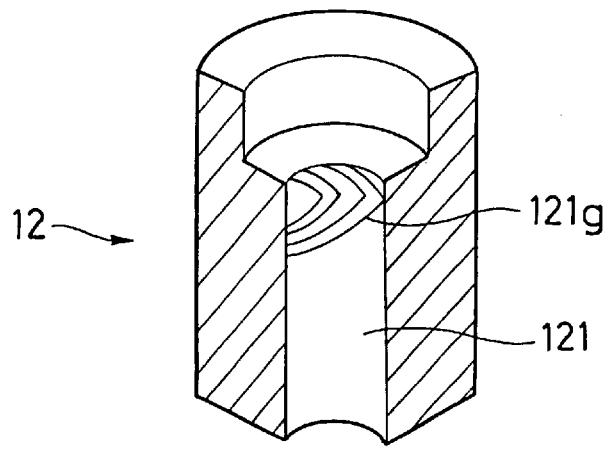
FIG. 3 is a partially cut-away perspective view of the sleeve, illustrating the pressure generating pattern on the inner wall surface of the sleeve.
Figure 4:
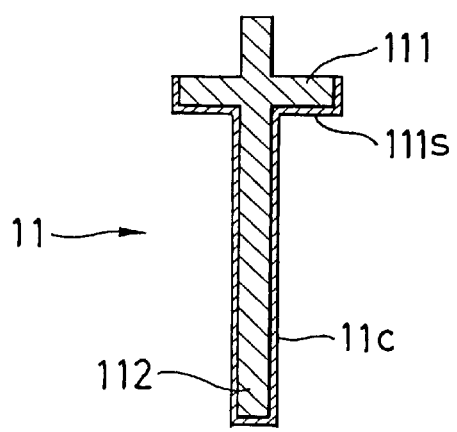
FIG. 4 is a cross-sectional view of the shaft.

Referring to FIG. 1, there is illustrated one exemplary construction of the fluid dynamic bearing according to the invention. The fluid dynamic bearing is typically used in a hard disk drive for driving a disk for rotation. The fluid dynamic bearing 1 includes a shaft 11 and a generally cylindrical sleeve 12 in which the shift is concentrically fitted for rotation to define a gap. The gap between the shaft 11 and the sleeve 12 is filled with a fluid which is typically an oil. The fluid may also be air or gas. The shaft 11 includes a shank 112 and an annular collar 111 extending radially outward from the shank 112. The collar 11 has a lower surface 111s opposed to one end portion 12s of the sleeve 12. The surface 111s of the collar 11 is designated as a thrust surface and formed with a predetermined pressure-generating pattern, for example, indented with concave grooves 111g as shown in FIGS. 2(a) and 2(b). The sleeve 12 has an outer cylindrical wall, an inner cylindrical wall 121, one axial end portion 12s and an axial opposite end portion. The inner cylindrical wall surface 121 of the sleeve 12 in contact with the fluid (e.g., oil or air or gas) is formed with a predetermined pressure-generating pattern, for example, indented with grooves 121g as shown in FIG. 3. When the shaft 11 rotates, such a pressure-generating pattern cooperates with the fluid (e.g., oil or air or gas) to generate a pressure distribution in the fluid to keep the shaft 11 afloat. Surfaces of the shaft 11 including the thrust surface 111s of the collar 111 opposed to one end portion 12s of the sleeve 12 and the surface of the shank 112 in contact with the fluid (e.g., oil or air or gas) are covered with a DLC film 11c as shown in FIG. 4. That is, the shaft 11 in the illustrated embodiment corresponds to the pattern-bearing member covered with a DLC film according to the invention. Herein, even after coverage with the DLC film, the grooves 111g in the shaft 11 maintain their shape and depth unchanged from the original state because the surface of the shaft including the grooves is covered with the film having a uniform reduced thickness.

Figure 5:
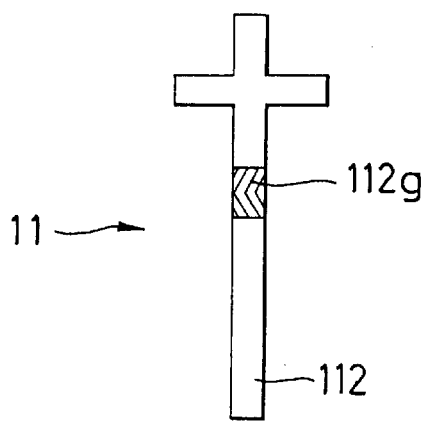
FIG. 5 is an elevational view of the shaft illustrating a pressure generating pattern on its shank.

The fluid dynamic bearing of the invention is not limited to the illustrated one, and modifications may be made thereto within the scope of the invention. The DLC film may further cover the surface of the one end portion 12s of the sleeve 12 opposed to the thrust surface 111s of the collar 111 of the shaft 11 and the cylindrical inner wall surface 121 of the sleeve 12 in contact with the fluid (e.g., oil or air or gas) whereby better results are obtained. The pressure-generating pattern may be formed only on the shaft 11 or only on the sleeve 12. Further, as shown in FIG. 5, a band portion of the surface of the shank 112 of the shaft 11 in contact with the fluid (e.g., oil or air or gas) may be indented with a pressure-generating pattern in the form of grooves 112g. The configuration of the pattern, specifically grooves or protrusions may be selected from various configurations depending on a particular application.

The DLC film may cover not only the surface of grooves or protrusions and the surface of lands of the pattern-bearing member according to the invention, but also the remaining surfaces of the member. The member free of the pattern may or may not be covered with the DLC film. As long as one pattern-bearing member covered with the DLC film is involved, the remaining member may not be covered with the DLC film or may be partially covered with the DLC film even if the remaining member has a pattern. It is not critical how to cover the member with the DLC film.

The diamond-like carbon (DLC) film serving as a coating film according to the invention is a high hardness carbon film obtained by exciting and decomposing hydrocarbon. The DLC film, also designated i-carbon film, has excellent characteristics including high hardness, wear resistance, flat surface, and chemical inertness.

With respect to the DLC film, reference is made to, for example, JP-A 62-145646, JP-A 62-145647, and New Diamond Forum, Vol. 4, No. 4 (Oct. 25, 1988). As described in New Diamond Forum, DLC exhibits a broad absorption peak around 1550 cm$^{-1}$ (1520–60 cm$^{-1}$) as analyzed by Raman spectroscopy and thus has a distinct structure distinguishable from diamond exhibiting a sharp peak at 1333 cm$^{-1}$ and graphite exhibiting a sharp peak at 1581 cm$^{-1}$.

The DLC film is a film consisting essentially of amorphous carbon and hydrogen wherein carbon-to-carbon sp$^3$ bonds are randomly distributed. DLC generally has a C/H atomic ratio of from about 95:5 to about 60:40. The DLC film preferably has a thickness of 0.01 to 10 μm, and more preferably 0.3 to 2 μm from the standpoints of wear resistance and roundness.

In addition to carbon and hydrogen, the DLC film may further contain at least one element of Si, N, O and F. Preferably the DLC film has a basic composition represented by

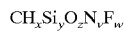

$CH_xSi_yO_zN_vF_w$ wherein x, y, z, v and w representative of molar ratios of the associated elements are in the range: $0.05 \leq x \leq 0.7$, $0 \leq y \leq 3.0$, $0 \leq z \leq 1.0$, $0 \leq v \leq 1.0$, and $0 \leq w \leq 0.2$.

Since the DLC film can be changed in lipophilicity by changing its compositional ratio, it is recommended to properly choose the composition in accordance with the type of fluid.

While the DLC film exhibits a broad absorption peak around 1550 cm$^{-1}$ (1520–60 cm$^{-1}$) on Raman spectroscopy as mentioned above, the inclusion of the above additional elements may shift the peak by about ±100 cm$^{-1}$.

The DLC film may be formed by plasma CVD, ionized evaporation and sputtering techniques.

When the DLC film is formed by the plasma CVD technique, the method described in JP-A 4-41672 may be used. The plasma used in the plasma CVD technique may be either of DC or AC, with AC being preferred. The frequency of AC may range from several hertz to microwaves. Also employable is ECR plasma as described in Diamond Thin Film Technology (published by Sogo Gijutsu Center). Application of a bias voltage is acceptable.

When the DLC film is formed by the plasma CVD technique, the reactant gas used is preferably selected from compounds of the following groups.

Compounds containing C and H include hydrocarbons such as methane, ethane, propane, butane, pentane, hexane, ethylene and propylene.

Compounds containing C, H and Si include methylsilane, dimethylsilane, trimethylsilane, tetramethylsilane, diethylsilane, tetraethylsilane, tetrabutylsilane, dimethyldiethylsilane, tetraphenylsilane, methyltriphenylsilane, dimethyldiphenylsilane, trimethylphenylsilane, trimethylsilyl-trimethylsilane, and trimethylsilylmethyltrimethylsilane. These compounds may be used in admixture of two or more while a mixture of a silane compound and a hydrocarbon is also acceptable.

Compounds containing C, H and O include $CH_3OH$, $C_2H_5OH$, HCHO, and $CH_3COCH_3$.

Compounds containing C, H and N include ammonium cyanide, hydrogen cyanide, monomethylamine, dimethylamine, allylamine, aniline, diethylamine, acetonitrile, azoisobutane, diallylamine, ethylazide, MMH, DMH, triallylamine, trimethylamine, triethylamine, and triphenylamine.

Also included are combinations of a compound containing Si, C and H, compound containing Si, C, H and O, or compound containing Si, C, H and N with an O, ON, N or H source. Exemplary O sources are $O_2$ and $O_3$. Exemplary C+O sources are CO and $CO_2$. An exemplary Si+H source is $SiH_4$. An exemplary H source is $H_2$. An exemplary H+O source is $H_2O$. An exemplary N source is $N_2$. An exemplary N+H source is $NH_3$. Exemplary N+O sources are nitrogen oxide compounds: NOx such as NO, $NO_2$ and $N_2O$. An exemplary N+C source is $(CN)_2$. An exemplary N+H+F source is $NH_4F$. Exemplary O+F sources are $OF_2$, $O_2F_2$, and $O_3F_2$.

The flow rate of the reactant gas may be suitably determined in accordance with its type and other factors. Usually a pressure of about 0.1 to 100 Pa (=0.001 to 1 Torr) and an input power of about 10 W to 5 kW are preferred for deposition.

Also the DLC film can be formed by the ionized evaporation technique. The ionized evaporation is described, for example, in JP-A 58-174507 and JP-A 59-174508. The method and apparatus are not limited to those described in these patents. An ionized evaporation technique of another type may be used insofar as an ionized gas from which a protective film is formed can be accelerated.

The preferred apparatus used herein is of the ion straight flow or deflection type described in JP-A 59-174507.

In the ionized evaporation technique, the vacuum chamber is evacuated to a high vacuum of about $10^{-4}$ Pa (=$10^{-6}$ Torr). Disposed in the vacuum chamber are a filament which is heated by an AC power supply to provide thermionic emission and a counter electrode surrounding the filament, a voltage Vd being applied between the filament and the counter electrode. An electromagnetic coil is disposed around the filament and the counter electrode for generating a magnetic field for confining an ionized gas. The reactant gas collides with thermal electrons from the filament to produce positive pyrolytic ions and electrons whereupon the positive ions are accelerated by a negative potential Va applied to the grid. By adjusting Vd, Va and the magnetic field of the coil, the composition and quality of a film to be deposited can be altered. A bias voltage may be applied.

When the DLC film is formed by the ionized evaporation technique, the reactant gas used may be the same as used in the plasma CVD technique. The flow rate of the reactant gas may be suitably determined in accordance with its type and other factors. Usually an operating pressure of about 0.1 to 100 Pa (=0.001 to 1 Torr) is preferred.

Moreover, the DLC film can be formed by the sputtering technique. Typically, the sputtering gas used is Ar or Kr, a reactive gas such as $O_2$, $N_2$, $NH_3$, $CH_4$ or $H_2$ may be additionally introduced, and the target used is C, Si, $SiO_2$, $Si_3N_4$, or SiC or of a mixed composition of C, Si, $SiO_2$, $Si_3N_4$ and SiC. Two or more targets containing C, Si, N and O may also be used. Polymers may also be used as the target. The target is sputtered by applying an AC power (typically RF power) or DC power, whereby the sputtered material is deposited on a substrate to form a DLC film. For the RF sputtering, the input power is usually about 50 W to 2 kW. The operating pressure is preferably about $10^{-3}$ to $10^{-1}$ Pa (=$10^{-5}$ to $10^{-3}$ Torr).

The DLC film may be deposited on the shaft or sleeve substrate directly or via an intermediate layer. The use of the intermediate layer is effective for achieving a firm bond independent of the substrate material. The intermediate layer used to this end is described, for example, in Japanese Patent Application Nos. 10-375444, 10-375445, 10-375446, and 10-375447. The intermediate layer may be formed by sputtering, vacuum evaporation or other techniques.

The shaft and sleeve substrates which are covered with the DLC film are typically made of metal materials, for example, stainless steel (e.g., SUS303 and SUS420J according to JIS), prehardened steel, die steel, high-speed steel, iron, copper, copper alloys (e.g., C3000 series), brass, aluminum, and aluminum alloys (e.g., A2000 series and A7000 series).

The fluid in which a pressure distribution is to be generated may be an oil, air or gas and other fluids commonly used in the art, with the oil and air or gas being preferred. The oil to be admitted into the gap between the shaft and the sleeve may be a commercially available one.

The pressure-generating pattern is formed on the shaft and/or sleeve substrate by engraving the substrate with grooves or providing the substrate with protrusions. The depth of the grooves from the land (which is the original surface of the substrate) is usually about 0.1 to 100 $\mu$m.

EXAMPLE

Examples of the invention are given below by way of illustration and not by way of limitation.

Example 1

A fluid dynamic bearing was assembled by combining a shaft with a sleeve as shown in FIGS. 1 to 4. The shaft and sleeve substrates were of stainless steel SUS303. The fluid used was a commercially available oil. The thrust surface on the collar of the shaft and the cylindrical inner wall surface of the sleeve were formed with grooves of 5 $\mu$m deep from the land to form pressure-generating patterns. Surfaces of the shaft including the thrust surface of the collar and the surface of the shank in contact with the oil were covered with a DLC film as shown in FIG. 4. The DLC film was formed to a thickness of 1 $\mu$m by a plasma CVD technique under the following conditions.

Deposition of DLC Film
  Reactant gas: $C_2H_4$
  Flow rate: 0.17 Pa·m$^3$·s$^{-1}$ (100 SCCM)
  Power supply: RF (13.56 MHz)
  Operating pressure: 66.5 Pa (0.5 Torr)
  Input power: 500 W
  Deposition rate: 100 nm/min
  The resulting DLC film had the composition: $CH_{0.21}$.
This fluid dynamic bearing is designated sample No. 101.

Another fluid dynamic bearing designated sample No. 102 was manufactured as sample No. 101 except that the DLC film was formed under the following conditions.
Deposition of DLC Film
  Reactant gases:
  $Si(OCH_3)_4$, flow rate 8.5×10$^{-2}$ Pa·m$^3$·s$^{-1}$ (50 SCCM)
  $CH_4$, flow rate 8.5×10$^{-2}$ Pa·m$^3$·s$^{-1}$ (50 SCCM)
  Power supply: RF (13.56 MHz)
  Operating pressure: 66.5 Pa (0.5 Torr)
  Input power: 500 W
  Deposition rate: 100 nm/min
  The resulting DLC film had the composition:

$CH_{0.20}Si_{0.1}O_{0.17}$.

A further fluid dynamic bearing designated sample No. 103 was manufactured as sample No. 101 except that the surface of the sleeve opposed to the thrust surface of the shaft collar and the cylindrical inner wall surface of the sleeve in contact with the oil were also covered with the same DLC film.

A still further fluid dynamic bearing designated sample No. 104 was manufactured as sample No. 101 except that the DLC film was omitted.

A still further fluid dynamic bearing designated sample No. 105 was manufactured as sample No. 101 except that the pressure-generating pattern was formed by the same DLC film as sample No. 101, but according to the teaching of JP-A 7-37233. The thickness of the DLC film was 5 $\mu$m and equal to the depth of grooves.

A still further fluid dynamic bearing designated sample No. 106 was manufactured as sample No. 103 except that the DLC film was formed on the area other than the pressure-generating pattern according to the teaching of JP-A 11-62947. The depth of grooves was 4 $\mu$m.

A still further fluid dynamic bearing designated sample No. 107 was manufactured as sample No. 101 except that instead of the DLC film, a diamond grit cluster thin film was formed by dispersing polycrystalline diamond grit clusters in an electroless nickel plating solution and codepositing nickel and diamond grits according to the teaching of JP-A 6-241232.

Each bearing of sample Nos. 101 to 107 was incorporated in a hard disk drive, which was operated by a contact-start-and-stop (CSS) test under the following conditions and evaluated for the following items.

CSS Test
  Load: ten disks
  Temperature: 70° C.
  Rotating time: 50 sec
  Quiescent time: 80 sec
  Number: 30,000 cycles Evaluation Items
  (1) Shaft wear
  After the CSS test, the depth ($\mu$m) of scratch flaws in the shaft was measured by a surface roughness meter.
  (2) Oil contamination
  After the CSS test, the oil was visually observed to see whether it was contaminated or not.
    ○: not contaminated
    Δ: not colored, but metal debris admixed
    X: colored
  (3) Shaft run-out synchronous with rotation
  The run-out ($\mu$m) of the shaft was measured before and after the CSS test.
  (4) Random shaft run-out
  The run-out ($\mu$m) of the shaft was measured before and after the CSS test.
  (5) Sleeve abrasion
  After the CSS test, the sleeve was visually observed to see whether it was abraded or not.
  (6) The number of CSS cycles repeated until the run-out of the shaft synchronous with rotation reached 2.54 $\mu$m (100 microinch).

The results are shown in Table 1.

TABLE 1

| Sample No. | DLC film | Shaft wear ($\mu$m) | Oil contamination | Shaft run-out synchronous with rotation ($\mu$m) Before test | Shaft run-out synchronous with rotation ($\mu$m) After test | Random shaft run-out ($\mu$m) Before test | Random shaft run-out ($\mu$m) After test | Sleeve abrasion | The number of CSS cycles repeated until the run-out of the shaft synchronous with rotation reached 2.54 $\mu$m |
|---|---|---|---|---|---|---|---|---|---|
| 101 | formed | <0.01 | ○ | 0.76 | 0.89 | $2.54 \times 10^{-2}$ | $2.54 \times 10^{-2}$ | nil | 100000 |
| 102 | formed | <0.01 | ○ | 0.76 | 0.89 | $2.54 \times 10^{-2}$ | $2.54 \times 10^{-2}$ | nil | 130000 |
| 103 | formed | <0.01 | ○ | 0.76 | 0.89 | $2.54 \times 10^{-2}$ | $2.54 \times 10^{-2}$ | nil | 200000 |
| 104* | not formed | 1.5 | X | 0.89 | 3.05 | $3.05 \times 10^{-2}$ | 0.10 | abraded | 25000 |
| 105* | pressure-generating pattern formed by DLC film | 0.2 | Δ | 0.89 | 1.14 | $2.79 \times 10^{-2}$ | $6.86 \times 10^{-2}$ | abraded | 50000 |
| 106* | DLC film outside pressure-generating pattern | 0.1 | Δ | 0.89 | 1.02 | $2.79 \times 10^{-2}$ | $6.86 \times 10^{-2}$ | nil | 60000 |
| 107* | diamond grit cluster thin film | 0.3 | X | 0.89 | 1.02 | $2.79 \times 10^{-2}$ | $7.37 \times 10^{-2}$ | abraded | 40000 |

*comparison

The effectiveness of the invention is evident from Table 1. As compared with sample No. 101, bearing sample No. 103 is reduced in shaft wear and shaft run-out during synchronized rotation and increased in the number of CSS cycles repeated until the run-out of the shaft during synchronized rotation becomes unacceptable, and thus had an extended lifetime.

As compared with JP-A 7-37233 and JP-A 11-62947, the invention is advantageous in manufacturing process and cost because the number of steps used in coating a DLC film is reduced.

Example 2

Fluid dynamic bearing sample Nos. 201 to 207 were manufactured by the same procedure as sample Nos. 101 to 107 except that air or gas was used as the fluid. As in Example 1, they were subjected to the CSS test and examined for shaft wear, shaft run-out, sleeve abrasion and CSS cycles. The results are shown in Table 2.

TABLE 2

| Sample No. | DLC film | Shaft wear ($\mu$m) | Shaft run-out synchronous with rotation ($\mu$m) | | Random shaft run-out ($\mu$m) | | Sleeve abrasion | The number of CSS cycles repeated until the run-out of the shaft synchronous with rotation reached 2.54 $\mu$m |
|---|---|---|---|---|---|---|---|---|
| | | | Before test | After test | Before test | After test | | |
| 201 | formed | <0.01 | 0.76 | 0.89 | $2.54 \times 10^{-2}$ | $2.54 \times 10^{-2}$ | nil | 100000 |
| 202 | formed | <0.01 | 0.76 | 0.89 | $2.54 \times 10^{-2}$ | $2.54 \times 10^{-2}$ | nil | 120000 |
| 203 | formed | <0.01 | 0.76 | 0.89 | $2.54 \times 10^{-2}$ | $2.54 \times 10^{-2}$ | nil | 190000 |
| 204* | not formed | 2.0 | 1.02 | 4.06 | $3.05 \times 10^{-2}$ | 0.15 | abraded | 15000 |
| 205* | pressure-generating pattern formed by DLC film | 0.3 | 1.02 | 1.65 | $2.79 \times 10^{-2}$ | 0.11 | abraded | 35000 |
| 206* | DLC film outside pressure-generating pattern | 0.2 | 1.02 | 1.52 | $2.79 \times 10^{-2}$ | 0.11 | nil | 45000 |
| 207* | diamond grit cluster thin film | 0.5 | 1.02 | 1.52 | $2.79 \times 10^{-2}$ | 0.11 | abraded | 32000 |

*comparison

As seen from Table 2, like Example 1 using oil as the fluid, the benefits of the invention are obtained when air or gas is used as the fluid.

There has been described a fluid dynamic bearing which has improved wear resistance and durability, ensures the precision of rotation, and experiences no loss of the precision of rotation by repeated operation. It is easy and inexpensive to manufacture.

What is claimed is:

1. A fluid dynamic bearing comprising:
   a sleeve;
   a shaft provided in the sleeve to relatively rotate with respect to the sleeve;
   a fluid filled between the sleeve and the shaft, at least one of the sleeve and the shaft having a concave and/or convex pattern including grooves and/or protrusions and lands to generate a pressure distribution in the fluid; and
   a diamond-like carbon film having a substantially uniform thickness and continuously covering substantially entire surfaces of the grooves and/or protrusions and the lands.

2. The fluid dynamic bearing according to claim 1, wherein said diamond-like carbon film has a basic composition represented by $CH_xSi_yO_zN_vF_w$ wherein x, y, z, v and w representative of molar ratios of the associated elements are in the range: $0.05 \leq x \leq 0.7$, $0 \leq y \leq 3.0$, $0 \leq z \leq 1.0$, $0 \leq v \leq 1.0$, and $0 \leq w \leq 0.2$.

3. The fluid dynamic bearing of claim 1, wherein said shaft has a collar opposed to one end portion of said sleeve and a shank fitted in said sleeve and having a surface in contact with the fluid, said collar has a thrust surface opposed to one end portion of said sleeve and provided with the pattern, and the thrust surface of said collar and the surface of said shank in contact with the fluid are covered with the diamond-like carbon film.

4. The fluid dynamic bearing of claim 3, wherein said sleeve has a cylindrical inner wall surface in contact with the fluid, which is provided with the pattern, and the one end portion of said sleeve opposed to the collar of said shaft and the inner wall surface of said sleeve are covered with the diamond-like carbon film.

5. The fluid dynamic bearing of claim 1, wherein said fluid is an oil or air or gas.

* * * * *